United States Patent
Du et al.

(10) Patent No.: US 10,222,643 B2
(45) Date of Patent: *Mar. 5, 2019

(54) TOUCH DISPLAY PANEL

(71) Applicants: Shanghai Tianma Micro-Electronics Co., Ltd., Shanghai (CN); Tianma Micro-Electronics Co., Ltd., Shenzhen (CN)

(72) Inventors: Lingxiao Du, Shanghai (CN); Qijun Yao, Shanghai (CN); Xingyao Zhou, Shanghai (CN)

(73) Assignees: Shanghai Tianma Micro-Electronics Co., Ltd., Shanghai (CN); Tianma Micro-Electronics Co., Ltd., Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 16/043,970

(22) Filed: Jul. 24, 2018

(65) Prior Publication Data

US 2018/0329249 A1 Nov. 15, 2018

Related U.S. Application Data

(63) Continuation of application No. 15/003,640, filed on Jan. 21, 2016, now Pat. No. 10,061,147.

(30) Foreign Application Priority Data

Jun. 30, 2015 (CN) .......................... 2015 1 0375783

(51) Int. Cl.
G06F 3/041 (2006.01)
G02F 1/1333 (2006.01)
G02F 1/1362 (2006.01)

(52) U.S. Cl.
CPC .... *G02F 1/13338* (2013.01); *G02F 1/136204* (2013.01); *G06F 3/0412* (2013.01); *G02F 2202/22* (2013.01)

(58) Field of Classification Search
CPC ..................... G06F 3/0412; G06F 2203/04107
USPC ..................... 178/18.01–19.07; 345/173–178
See application file for complete search history.

(56) References Cited

U.S. PATENT DOCUMENTS

| | | |
|---|---|---|
| 2013/0021657 A1 | 1/2013 | Tomikawa et al. |
| 2013/0141687 A1 | 6/2013 | Wang |
| 2014/0036166 A1 | 2/2014 | Kurasawa et al. |
| 2014/0118279 A1 | 5/2014 | Ding et al. |
| 2014/0168540 A1 | 6/2014 | Wang et al. |
| 2016/0017168 A1 | 1/2016 | Korchev et al. |

FOREIGN PATENT DOCUMENTS

| | | |
|---|---|---|
| CN | 102827526 A | 12/2012 |
| CN | 102830564 A | 12/2012 |
| CN | 102999223 A | 3/2013 |
| CN | 103293749 A | 9/2013 |
| CN | 104049798 A | 9/2014 |
| JP | 2009157188 A | 7/2009 |
| TW | 548501 B | 8/2003 |

*Primary Examiner* — Michael Pervan
(74) *Attorney, Agent, or Firm* — Faegre Baker Daniels LLP (57) ABSTRACT

A touch display panel includes an array substrate and an opposite substrate disposed opposite to the array substrate. The opposite substrate includes a first base substrate and a high-resistance film material layer which is disposed on the first base substrate, and a square resistance of the high-resistance film material layer is larger than or equal to $10^7 \Omega/\square$ and is less than or equal to $10^{12} \Omega/\square$.

16 Claims, 8 Drawing Sheets

TOUCH DISPLAY PANEL

CROSS-REFERENCE TO RELATED APPLICATION

This application claims priority U.S. application Ser. No. 15/003,640, filed Jan. 21, 2016, which claims priority to Chinese Application No. 201510375783.6, filed Jun. 30, 2015, both of which are herein incorporated by reference in their entireties.

TECHNICAL FIELD

The present disclosure relates to the field of liquid crystal display technologies and, in particular, to a touch display panel.

BACKGROUND

Figure 1:
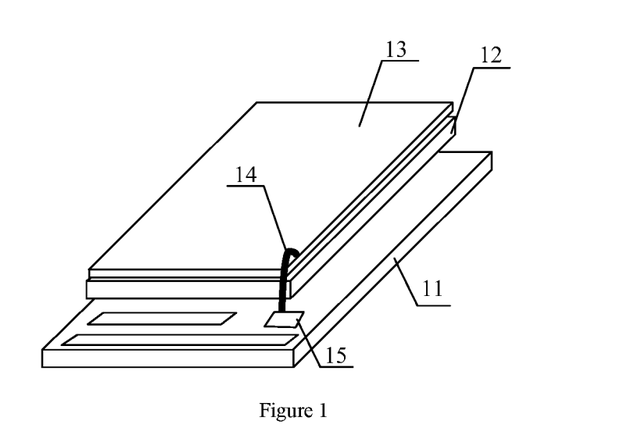
FIG. 1 is a schematic diagram showing the structure of a display panel in the related art.

FIG. 1 is a schematic diagram showing the structure of a display panel in the related art within the field of liquid crystal display technologies. As shown in FIG. 1, an existing display panel includes an upper substrate and a lower substrate, i.e., an array substrate 11 and a color filter substrate 12. Additionally, in order to prevent an external electric field from influencing the displaying of the display panel, a shielding film, for example an Indium-Tin-Oxide (ITO) film 13 with a thickness of about 200 Å, can be deposited on the outside of the color filter substrate 12.

Additionally, after the display panel is assembled, the ITO film 13 is electrically connected with a grounding piece 15 on the array substrate via conductive silver paste 14, so that the ITO film 13 is grounded during the displaying of the display panel, to shield the displaying of the display panel from the external influence.

With the application of touch technologies, touch elements are generally integrated into the display panel at present and, more particularly, onto the color filter substrate or the array substrate, to form a touch display panel. The square resistance of the typical ITO film used in the related art is about 300Ω/□, thus the ITO film will shield off not only the influence of the environment on the displaying of the display panel, but also a touch signal from the environment, thereby influencing the touch sensing performance of the touch display panel.

SUMMARY

The present disclosure provides a touch display panel to avoid the influence of a shielding film on the touch sensing performance of the touch display panel.

The disclosure provides a touch display panel, which includes an array substrate and an opposite substrate disposed opposite to the array substrate, where the opposite substrate includes a first base substrate and a high-resistance film material layer which is disposed on the first base substrate, and the square resistance of the high-resistance film material layer is larger than or equal to $10^7 \Omega/\square$ and is less than or equal to $10^{12} \Omega/\square$.

In the touch display panel, according to embodiments of the disclosure, the opposite substrate includes the first base substrate, on which the high-resistance film material layer with a square resistance larger than or equal to $10^7 \Omega/\square$ and less than or equal to $10^{12} \Omega/\square$ is disposed. By using such high-resistance film material layer, the generated static electricity such as charges generated due to a high voltage (for example, at or above the level of kilovolt (KV)) may be discharged via the high-resistance film material layer for the purpose of releasing the static electricity. However, during touch detection, the high-resistance film material layer will not release charges accumulated due to a touch by a finger and the like, that is, the high-resistance film material layer has a weak shielding effect on the charge signal generated due to the touch by the finger and the like, without influencing the touch sensing performance of the touch display panel.

While multiple embodiments are disclosed, still other embodiments of the disclosure will become apparent to those skilled in the art from the following detailed description, which shows and describes illustrative embodiments of the disclosure. Accordingly, the drawings and detailed description are to be regarded as illustrative in nature and not restrictive.

BRIEF DESCRIPTION OF THE DRAWINGS

In order to more clearly illustrate the technical solutions in the embodiments of the disclosure or in the related art, the accompanying drawings for the description of the embodiments or the related art will be introduced briefly below. The accompanying drawings for the description below illustrate some embodiments of the disclosure, but other drawings may be obtained in light of these accompanying drawings.

While the disclosure is amenable to various modifications and alternative forms, specific embodiments have been shown by way of example in the drawings and are described in detail below. The intention, however, is not to limit the disclosure to the particular embodiments described. On the contrary, the disclosure is intended to cover all modifications, equivalents, and alternatives falling within the scope of the disclosure as defined by the appended claims.

DETAILED DESCRIPTION

In order to make the objects, technical solutions and advantages of the disclosure more clear, the technical solution of the disclosure will be clearly and fully described by the embodiments in conjunction with the accompanying drawings for the embodiments of the disclosure. The embodiments described are merely a part of rather than all of the possible embodiments of the disclosure. Other embodiments based on the described embodiments of the disclosure pertain to the protection scope of the disclosure.

Figure 2A:
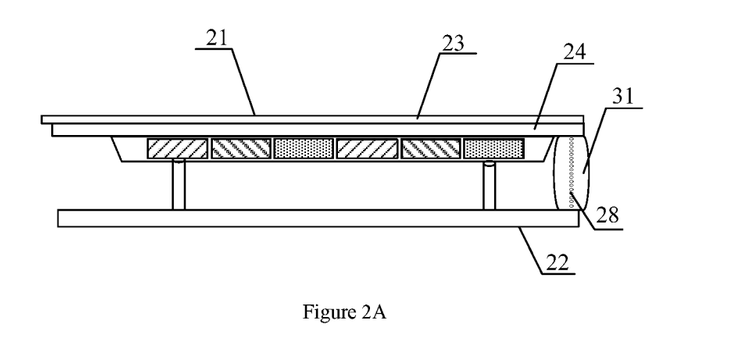
FIG. 2A is a schematic sectional view showing the structure of a touch display panel, according to embodiments of the disclosure.

FIG. 2A is a schematic diagram showing the structure of a touch display panel, according to embodiments of the disclosure. The touch display panel includes an array substrate 22 and an opposite substrate 21 disposed opposite to the array substrate 22. The opposite substrate 21 includes a first base substrate 23 and a high-resistance film material layer 24, which is disposed on the first base substrate 23 and has a square resistance larger than or equal to $10^7 \Omega/\square$ and less than or equal to $10^{12} \Omega/\square$.

As such, in the touch display panel, according to embodiments of the disclosure, the high-resistance film material layer is disposed on the first base substrate of the opposite substrate, and the square resistance of the high-resistance film material layer is larger than or equal to $10^7 \Omega/\square$ and is less than or equal to $10^{12} \Omega/\square$. By using such high-resistance film material layer, the generated static electricity such as charges generated due to a high voltage (for example, at or above the level of kilovolt) may be discharged via the high-resistance film material layer for the purpose of releasing the static electricity. However, during touch detection, the high-resistance film material layer will not release charges accumulated due to a touch by a finger and the like, that is, the high-resistance film material layer has a weak shielding effect on the charge signal generated due to the touch by the finger and the like, without influencing the touch sensing performance of the touch display panel.

Figure 2B:
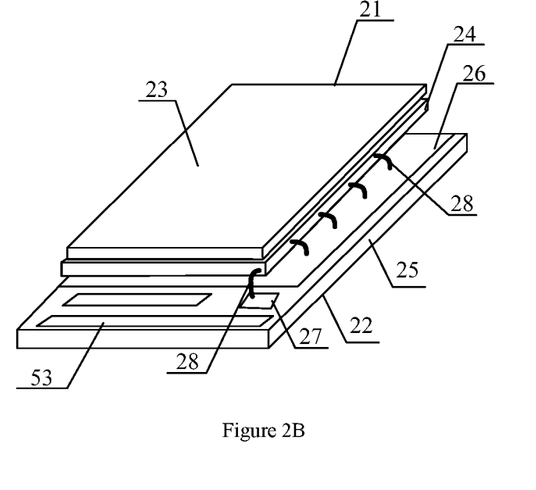
FIG. 2B is a schematic perspective view showing the structure of the touch display panel, according to embodiments of the disclosure.

FIG. 2B is a schematic sectional view showing the structure of the touch display panel, according to embodiments of the disclosure. The array substrate includes a second base substrate 25, and a common electrode layer 26 and a grounding piece 27 that are disposed on the second base substrate 25. The high-resistance film material layer 24 on the first base substrate 21 is electrically connected with the common electrode layer 26, or is grounded (that is, the high-resistance film material layer 24 is electrically connected with the grounding piece 27). The employment of the above technical solutions allows that: the generated static electricity such as charges generated due to a high voltage (for example, at or above the level of kilovolt) can be discharged via the high-resistance film material layer for the purpose of releasing the static electricity.

Further, in the embodiments of the disclosure, a first conductive line 28 is provided between the first base substrate 23 and the second base substrate 25, so that the high-resistance film material layer 24 is electrically connected with the common electrode layer 26 or is grounded via the first conductive line 28.

The first conductive line 28 in the above embodiments may be implemented in two manners. According to one of the two manners, referring again to FIG. 2A, a perimeter sealant 31 is disposed between the opposite substrate 21 and the array substrate 22 in the touch display panel, and at least a region of the perimeter sealant 31 is conductive to form the first conductive line 28. For example, conductive metal balls are doped in the perimeter sealant to form the conductive region in the perimeter sealant.

Figure 3A:
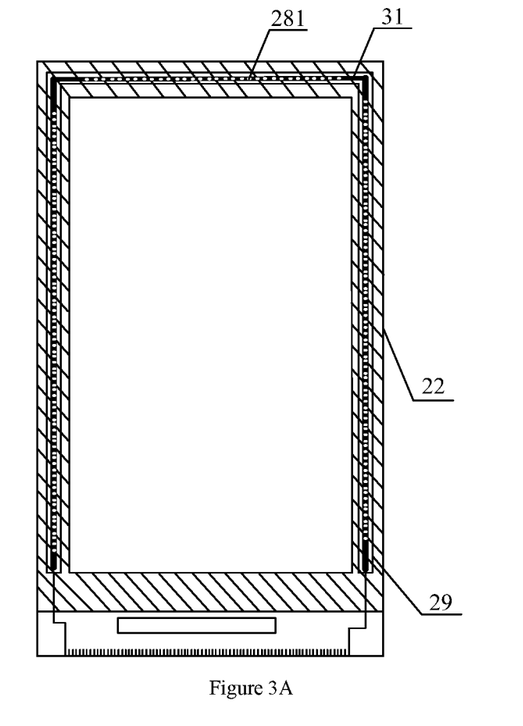
FIG. 3A is a schematic top view of the touch display panel, according to embodiments of the disclosure.

FIG. 3A is a schematic top view of the touch display panel, according to embodiments of the disclosure. The perimeter sealant 31 has a frame-shaped structure, and at least one side edge and/or at least one corner region of the perimeter sealant 31 is configured as conductive. As shown in FIG. 3A, conductive metal balls 281, for example conductive copper balls, are doped at three side edges of the perimeter sealant 31 to form the first conductive line 28 in the perimeter sealant 31. Alternatively, as shown in FIG. 3B, conductive metal balls 281, for example conductive copper balls, are doped in two corner regions of the perimeter sealant 31, so that the perimeter sealant becomes conductive to form the first conductive line 28 therein.

Figure 3B:
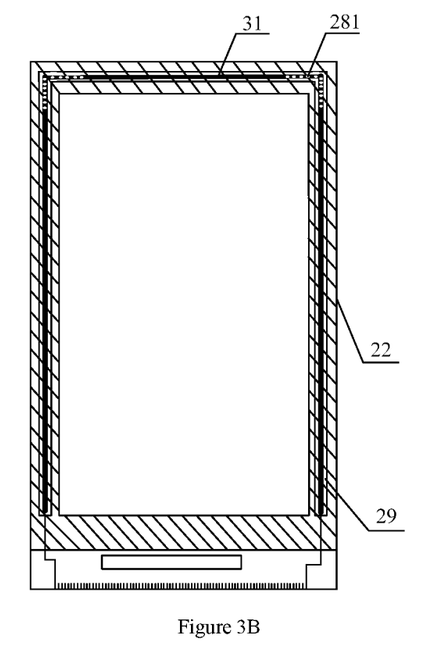
FIG. 3B is another schematic top view of the touch display panel, according to embodiments of the disclosure.
Figure 3C:
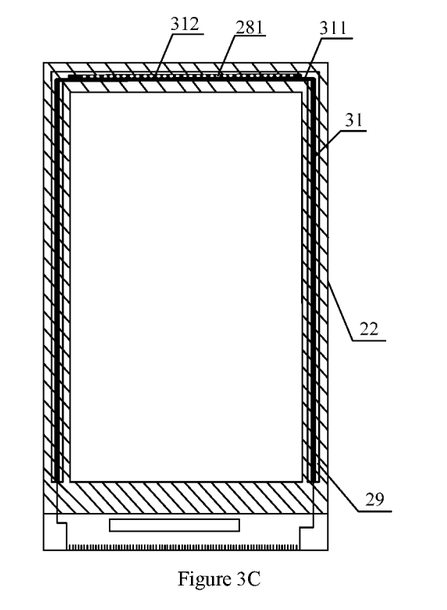
FIG. 3C is still another schematic top view of the touch display panel, according to embodiments of the disclosure.
Figure 3D:
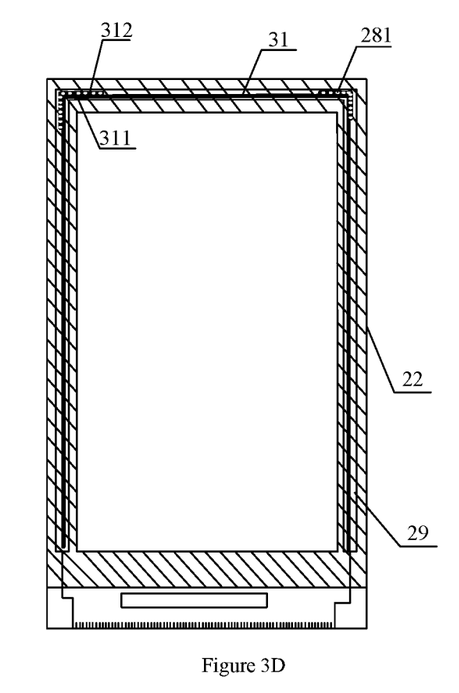
FIG. 3D is yet another schematic top view of the touch display panel, according to embodiments of the disclosure.

As shown in both FIG. 3A and FIG. 3B, a single perimeter sealant 31 is disposed, and conductive metal balls are doped in the perimeter sealant 31 to form the first conductive line. Alternatively, as shown in FIG. 3C and FIG. 3D, a nonconductive first perimeter sealant 311 without conductive metal balls is disposed between the opposite substrate and the array substrate, and a second perimeter sealant 312 containing conductive metal balls 281 is disposed at the outside of the first perimeter sealant 311, that is, beside at least one side edge and/or at least one corner region of the first perimeter sealant 311. FIG. 3C shows a second perimeter sealant 312 disposed beside one side edge of the first perimeter sealant 311, and FIG. 3D shows a second perimeter sealant 312 disposed beside two corner regions of the first perimeter sealant 311.

Figure 4A:
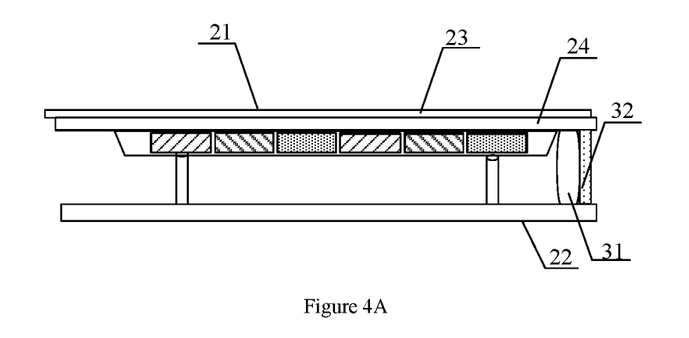
FIG. 4A is a schematic sectional view showing the structure of a touch display panel, according to embodiments of the disclosure.

Unlike the above embodiments in which conductive metal balls are doped in the perimeter sealant to form the first conductive line, embodiments of the disclosure further provide the other of the two manners of implementing the first conductive line. Referring to FIG. 4A, a perimeter sealant 31 is disposed between the opposite substrate 21 and the array substrate 22, and conductive silver paste 32 is disposed as the first conductive line 28 on the outside of the perimeter sealant 31. Moreover, in embodiments, the conductive silver paste 32, rather than the perimeter sealant 31, is configured for an electrical connection, thus the perimeter sealant 31 may be formed of a nonconductive material.

Figure 4B:
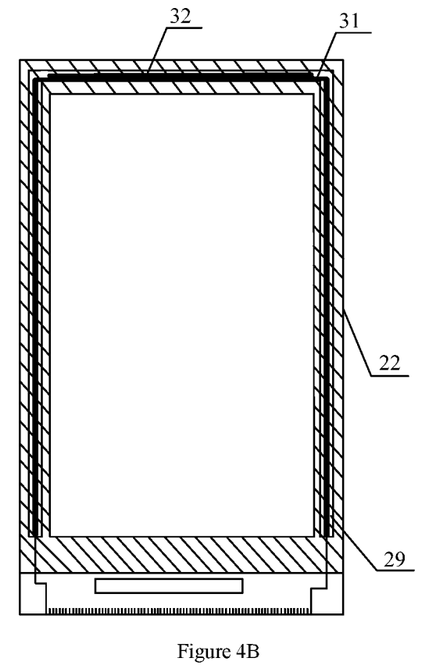
FIG. 4B is a schematic top view of the touch display panel, according to embodiments of the disclosure.
Figure 4C:
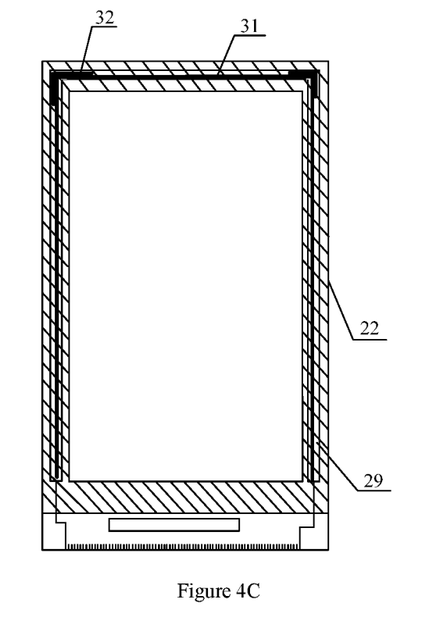
FIG. 4C is a schematic top view of the touch display panel, according to embodiments of the disclosure.

Additionally, in the case of the other of the two manners, the perimeter sealant 31 may also have a frame-shaped structure, and the conductive silver paste 32 is disposed on the outside of at least one side edge and/or at least one corner region of the perimeter sealant 31. For example, as shown in FIG. 4B, the conductive silver paste 32 is disposed beside one side edge of the perimeter sealant 31; and as shown in FIG. 4C, the conductive silver paste 32 is disposed beside two corner regions of the perimeter sealant 31.

Figure 5:
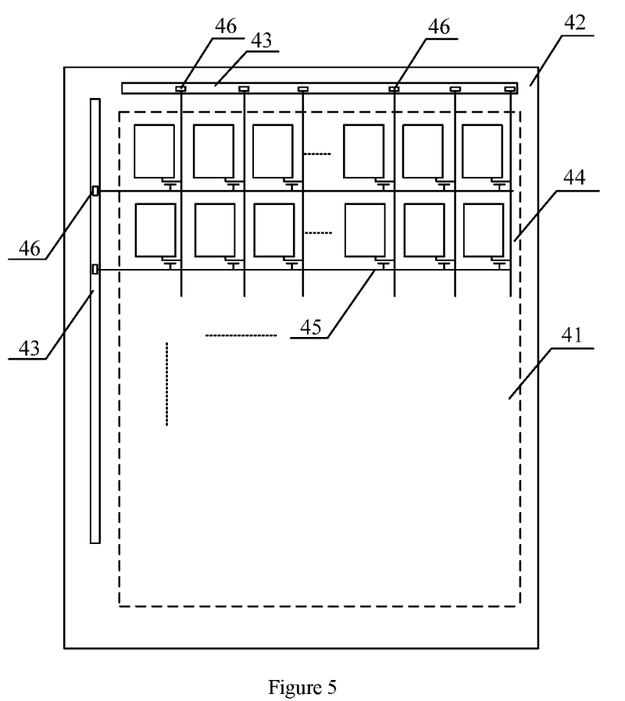
FIG. 5 is a schematic top view of an array substrate, according to embodiments of the disclosure.

In the above embodiments of the disclosure, the first conductive line 28 may be formed in various manners, and may be disposed at different locations. In some embodiments, the particular location of the first conductive line is selected according to the specific structure of the array substrate. For example, as shown in FIG. 5 which is a schematic top view of an array substrate, according to embodiments of the disclosure, the second base substrate 25 includes a display region 41 and a non-display region 42 around the display region 41, where drive signal circuits 43 are disposed in the non-display region 42 of the second base substrate 25, data lines 44 and scan lines 45 are disposed in the display region 41 of the second base substrate 25, and the data lines 44 and/or the scan lines 45 are electrically connected with the drive signal circuits 43 via bridge structures (i.e. bypass structures) 46 located in the non-display region 42. Depending on manufacturing processes, the bridge structures 46 may be exposed as the uppermost layer of the array substrate, or an insulating layer may be further disposed above the bridge structure 46 along a light transmission direction of the display panel.

When the bridge structures 46 are exposed as the uppermost layer of the array substrate, the first conductive line is required to bypass the bridge structures 46, that is, a projection of the first conductive line onto the second base substrate 25 is required not to overlap projections of the drive signal circuits 43 onto the second base substrate 25, so that the first conductive line is insulated from the bridge structures. When the first conductive line 28 is implemented in the above-described two manners, according to embodiments of the disclosure, i.e. when the conductive metal balls are doped in the perimeter sealant 31 at at least one side edge and/or at least one corner region of the perimeter sealant 31 to form the first conductive line 28, or the conductive silver paste 32 is disposed as the first conductive line 28 on the outside of at least one side edge and/or at least one corner region of the perimeter sealant 31, the first conductive line can bypass the bridge structures effectively.

Figure 6A:
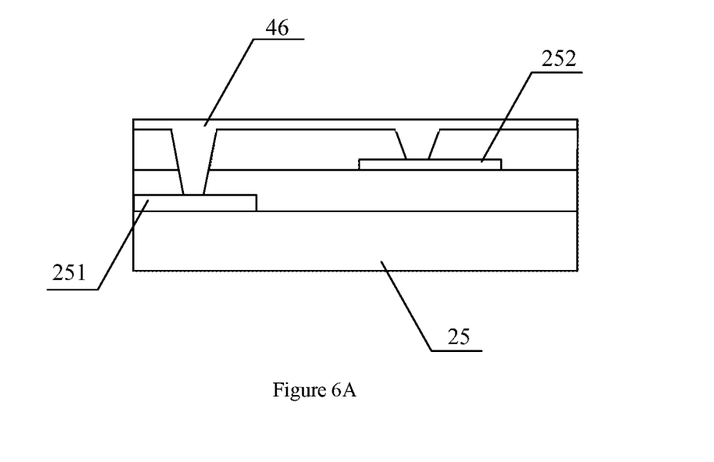
FIG. 6A is a first schematic sectional view of an array substrate, according to embodiments of the disclosure.

The array substrate is manufactured by six masking processes. As shown in FIG. 6A which is a schematic sectional view of an array substrate, according to embodiments of the disclosure, the array substrate includes a first base substrate 25, a first metal layer 251 and a second metal layer 252. The drive signal circuit 43 is located in the first metal layer 251, while the data lines 44 or scan lines 45 are located in the second metal layer 252 and electrically connected with the drive signal circuit 43 via the bridge structures 46, in this case, the bridge structures 46 are exposed as the uppermost layer of the array substrate. Referring to the above embodiments, if disposed on the opposite substrate or the array substrate, the perimeter sealant 31 or the conductive silver paste 32 tends to be in contact and electrically connected with the bridge structures 46. In this case, the projection of the first conductive line 28 onto the second base substrate 25 shall not overlap the projection of the drive signal circuit 43 onto the second base substrate 25, so that the first conductive line 28 is insulated from the bridge structures 46. In embodiments, the bridge structures 46 may be located on the same layer as pixel electrodes on the array substrate, that is, the bridge structures 46 and the pixel electrodes may be formed in the same one manufacturing process. Herein, the bridge structures 46 may be formed of Indium-Tin-Oxide (ITO).

Figure 6B:
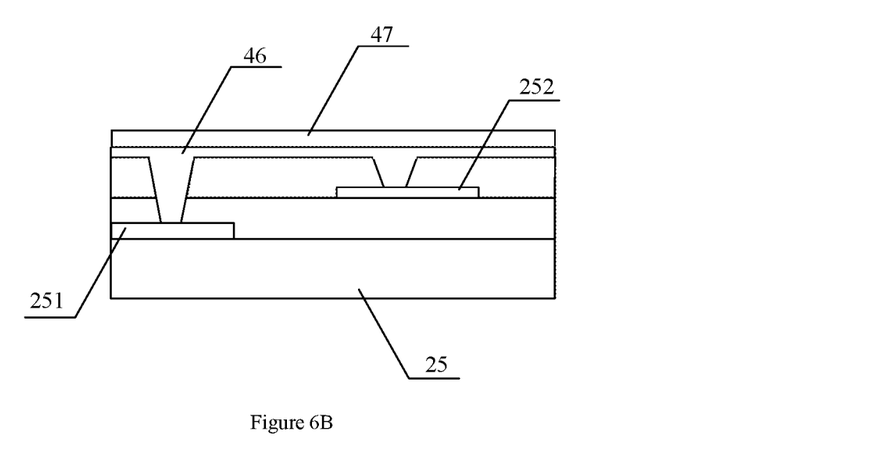
FIG. 6B is a second schematic sectional view of the array substrate, according to embodiments of the disclosure.

Or, in the case that an insulating layer 47 is disposed above the bridge structures 46 in the light transmission direction, referring to the above embodiments, the projections of the first conductive lines 28 onto the second base substrate 25 may at least partially overlap the projections of the drive signal circuits 43 onto the second base substrate 25. For example, for an array substrate with an embedded touch sensing function manufactured by eight masking processes, as shown in FIG. 6B which is a schematic sectional view of the array substrate, according to embodiments of the disclosure, the drive signal circuit 43 is located in the first metal layer 251, while the data lines 44 or scan lines 45 are located in the second metal layer 252 and are electrically connected with the drive signal circuit 43 via the bridge structures 46. Further, an insulating layer 47 is disposed above the bridge structures 46. In this case, because the bridge structures 46 are covered by the insulating layer 47 thereon, the possible electrical connection between the first conductive line 28 and the bridge structures 46 is avoided no matter where the first conductive line 28 is disposed, either in the case that the first conductive line 28 is formed by the perimeter sealant 31 doped with conductive metal balls or by the conductive silver paste 32, according to the above embodiments of the disclosure. In embodiments, the bridge structure 46 may be located on the same layer as the pixel electrodes on the array substrate, that is, the bridge structure 46 and the pixel electrodes may be formed in the same one manufacturing process. Herein, the bridge structure 46 may be formed of ITO.

In embodiments of the disclosure, the drive signal circuit 43 is connected with the data lines 44, to supply image display signals to the respective pixel units via the data lines. Alternatively, the drive signal circuit 43 is connected with the scan lines 45 via shift registers, and the drive signal circuit 43 is configured to output one or more of a clock signal, a high level signal, a low level signal and a scan triggering signal to the shift registers, which in turn generate scan signals according to the signal inputted thereto and output the generated scan signals to the respective scan lines 45.

In embodiments of the disclosure, in order to electrically connect the high-resistance film material layer on the opposite substrate with the common electrode layer and the grounding piece on the array substrate, a first conductive line 28 is disposed between the opposite substrate and the array substrate. Further, referring to the FIGS. 3A, 3B, 3C, 3D, 4B and 4C, a second conductive line 29 is disposed on the array substrate, and a first end of the second conductive line 29 is electrically connected with one end of the first conductive line 28, while a second end thereof is electrically connected with the common electrode layer 26 or is grounded. Here, the other end of the first conductive line 28 is connected with the high-resistance film material layer on the opposite substrate. When grounded, the second end of the second conductive line 29 is electrically connected with the grounding piece 27.

Figure 6C:
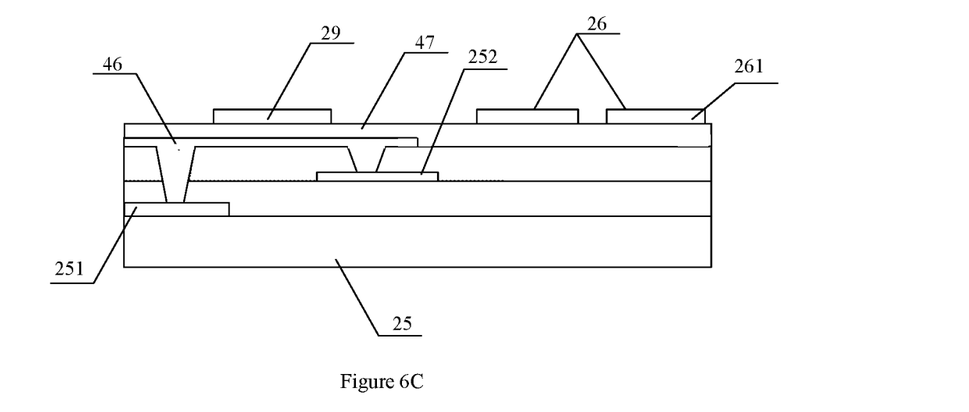
FIG. 6C is a third schematic sectional view of the array substrate, according to embodiments of the disclosure.

FIG. 6C is a schematic sectional view of the array substrate, according to embodiments of the disclosure. In addition to the structure in the example shown in FIG. 6B, a common electrode layer 26 and a second conductive line 29 are further disposed above the insulating layer in embodiments, and if the second end of the second conductive line 29 is electrically connected with the common electrode layer 26, the second conductive line 29 functions as a common voltage signal line. Further, in embodiments shown in the above FIG. 6B, the common electrode layer 26 is located on a side of the insulating layer 47 that is away from the second base substrate 25, and is located on the same layer as the common voltage signal line.

In the array substrate with an embedded touch sensing function, according to embodiments of the disclosure, referring to FIG. 6C, the common electrode layer 26 may include a plurality of common electrode blocks 261 which can be reused as touch electrodes. The common electrode blocks 261 which are operable as touch electrodes can be used for both a display function and the touch sensing function, according to embodiments. During a display phase, a common voltage signal is applied to the common electrode blocks 261, while during a touch phase, touch driving signals are applied to the common electrode blocks 261 operating as touch electrodes for touch detection. As such, the reuse of the common electrode blocks 261 as the touch electrodes eliminates the provision of an additional touch electrode layer, thus effectively reducing the thickness of the array substrate and the whole touch display panel.

Figure 7:
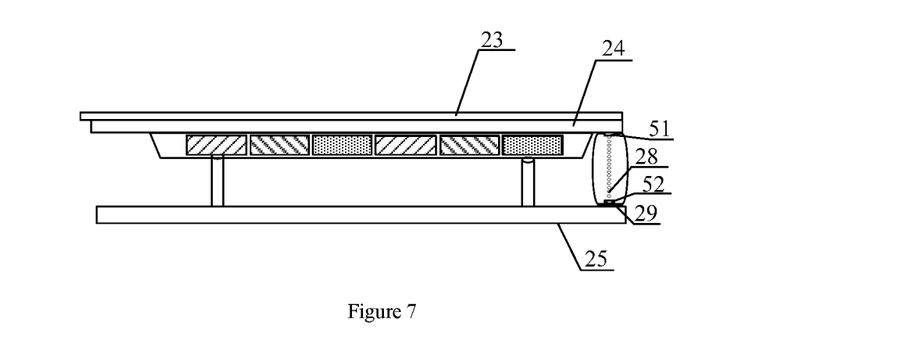
FIG. 7 is a schematic diagram showing the structure of a touch display panel, according to embodiments of the disclosure.

In embodiments of the disclosure, in order to improve the connection between the high-resistance film material layer on the opposite substrate and the first conductive line as well as the connection between the first conductive line and the second conductive line, referring to FIG. 7 which is a schematic view showing the structure of a touch display panel, according to embodiments of the disclosure, a first bonding pad 51 is further disposed on the first base substrate 23, and/or a second bonding pad 52 is disposed on the second base substrate 25. The high-resistance film material layer 24 on the first base substrate 23 is electrically connected with the first conductive line 28 via the first bonding pad 51, and the first conductive line 28 is electrically connected with the second conductive line 29 via the second bonding pad 52.

Further, referring to FIG. 2B, in embodiments of the disclosure, the touch display panel further includes a flexible circuit board 53, and the high-resistance film material layer 24 and the common electrode layer 26 are both electrically connected with a common electrode signal terminal of the flexible circuit board 53. As such, during the displaying of the touch display panel, a common voltage signal is applied to the common electrode layer 26, and hence the high-resistance film material layer 24 is also applied with the common voltage signal simultaneously, thus shielding off the influence of an outer electric field on the displaying of the touch display panel, and improving the reliability of discharging the static electricity from the touch display panel, meanwhile, the influence of the high-resistance film material layer 24 on the touch detection signal during the touch phase is insignificant.

Figure 8A:
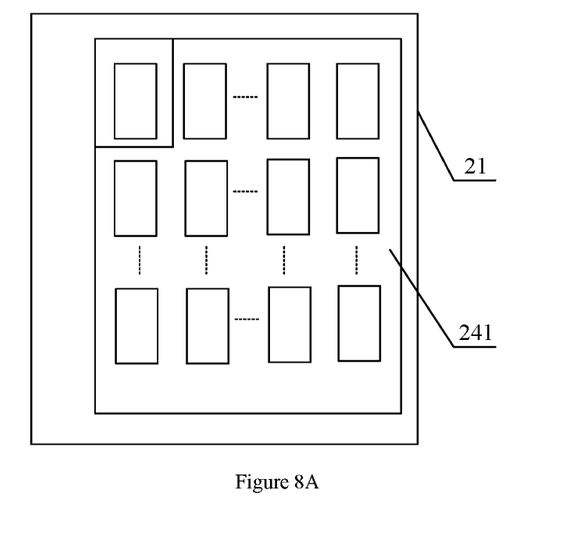
FIG. 8A is a schematic diagram showing the structure of a black matrix, according to embodiments of the disclosure.

FIG. 8A is a schematic diagram showing a structure of a black matrix, according to embodiments of the disclosure. In embodiments of the disclosure, the high-resistance film material layer is embodied as a black matrix 241 doped with carbon powder on the opposite substrate 21, and the square resistance of the high-resistance film material layer is equal to the equivalent square resistance of the black matrix 241. In embodiments of the disclosure, the black matrix has a grid structure, and the square resistance of the black matrix with the grid structure may be equivalently calculated as a square resistance of an equivalent layer without openings, i.e., the equivalent square resistance. In embodiments, by doping an amount of carbon powder in the black matrix 241, the equivalent square resistance of the black matrix 241 is adjusted to be larger than or equal to $10^7 \Omega/\square$ and less than or equal to $10^{12} \Omega/\square$.

In embodiments of the disclosure, the high-resistance film material layer 24 is formed by the black matrix, so that the dedicated high-resistance film material layer on the opposite substrate is eliminated, so that the existing process for manufacturing the opposite substrate is applicable in the embodiment, thus saving costs.

In embodiments of the disclosure where the high-resistance film material layer is formed by a black matrix, the doping of the carbon powder into the black matrix changes not only the square resistance of the black matrix, but also the optical density of the black matrix which influence the shading effect of the black matrix, and the optical density of the black matrix is larger than or equal to 3 in the embodiment, to ensure a good shading effect of the black matrix. However, in embodiments of the disclosure, by controlling the content of the carbon powder in the black matrix and the thickness of the black matrix, the optical density of the black matrix is adjusted to be larger than or equal to 3, and the equivalent square resistance of the black matrix is larger than or equal to $10^7 \Omega/\square$ and less than or equal to $10^{12} \Omega/\square$.

The square resistance $R_\Pi$ and the optical density $OD$ of the black matrix may be derived as follows.

The optical density $OD$ of the black matrix is calculated as $OD = \lg(1/T)$ where T represents light transmissivity of the black matrix.

Generally, the square resistance $R_\Pi$ of the black matrix varies with the content of carbon powder, that is, when the content of carbon powder is increased, the resistivity $\rho$ of the black matrix is lowered. If the thickness of the black matrix is 1 μm, the square resistance $R_\Pi$ of the black matrix is equal to the resistivity $\rho$ of the black matrix, and the value of the optical density $OD$ of the black matrix is equal to an optical density s corresponding to a unit thickness of the black matrix.

For example, given a sample 1 of the black matrix and a sample 2 of the black matrix, where the content of carbon powder doped in the sample 2 is lower than the content of carbon powder doped in the sample 1, thus the sample 2 has a higher resistivity $\rho$ than the sample 1, and the value of the optical density s of the sample 2 corresponding to the unit thickness is smaller than the sample 1. The related parameters of the samples 1 and 2 meet relationships below:

$\rho_2 = m\rho_1$, that is, the resistivity $\rho_2$ of the sample 2 is m times the resistivity $\rho_1$ of the sample 1;

$$S_2 = \frac{1}{n} S_1,$$

that is, the value $S_1$ of the optical density of the sample 1 per unit thickness is n times the value $S_2$ of the optical density of the sample 2 per unit thickness;

$d_2 = \alpha^* d_1$, that is, the thickness $d_2$ of the sample 2 is $\alpha$ times the thickness $d_1$ of the sample 1; and $R_{\Pi 2} = \beta \cdot R_{\Pi 1}$, that is, the square resistance $R_{\Pi 2}$ of the sample 2 is $\beta$ times the square resistance $R_{\Pi 1}$ of the sample 1;

where, m, n, $\alpha$ and $\beta$ are all larger than 1.

Additionally, it may be known from the Lambert Beer Law that, the optical density $OD$ of the black matrix is proportional to the optical density s of the black matrix per unit thickness, that is, $OD = s^*d$ where d represents the thickness of the black matrix.

The square resistance $R_{\Pi 2}$ of the sample 2 is given as $$R_{\Pi 2} = \frac{\rho_2}{d_2} = \frac{m*\rho_1}{\alpha * d_1} = \frac{m}{\alpha} R_{\Pi 1}.$$

The value of the optical density $OD_2$ of the sample 2 is given as $$OD_2 = S_2 * d_2 = \frac{1}{n} S_1 * \alpha d_1 = \frac{\alpha}{n} OD_1.$$

According to a formula $$\begin{cases} R_{\Pi 2} = \beta * R_{\Pi 1} \\ OD_2 > OD_1 \end{cases},$$

it may further be obtained that $$\begin{cases} \beta = m/\alpha \\ \alpha > n \end{cases}.$$

Thus it may be seen that, if the resistivity $\rho_2$ of the sample 2 is m times the resistivity $\rho_1$ of the sample 1, and the value $S_1$ of the optical density of the sample 1 per unit thickness is n times the value $S_2$ of the optical density of the sample 2 per unit thickness, then, when the thickness $d_2$ of the sample 2 is a times the thickness $d_1$ of the sample 1, the square resistance $R_{\Pi 2}$ of the sample 2 is m/α times the square resistance $R_{\Pi 1}$ of the sample 1; and when α>n, it may be met that the optical density of the sample 2 is larger than the optical density of the sample 1.

For example, samples 1 and 2 that meet specifications below are given.

| Sample | Value S of optical density per unit thickness (/μm) | Square resistance Value (Ω/□) | Thickness (μm) | Value of optical density of sample |
|---|---|---|---|---|
| Sample 1 | 3.8 | $10^7$ | 1.0 | 3.8 |
| Sample 2 | 3.2 | $10^{15}$ | 1.3 | 4.16 |

It may be known from the above parameters that, $$m = \frac{\rho_2}{\rho_1} = 10^8,$$

n=$S_1/S_2$=1.2, and β=m/α=$10^8$/α.

If α>1.2, then ②>①; at the same time, the square resistance value of the sample 2 is obtained as $10^{15}$/α (Ω/□), so that the square resistance value can match the optical density value by adjusting the thickness of the sample; in some embodiments, the thickness of the black matrix is in a range from 0.5 μm to 3.5 μm.

Figure 8B:
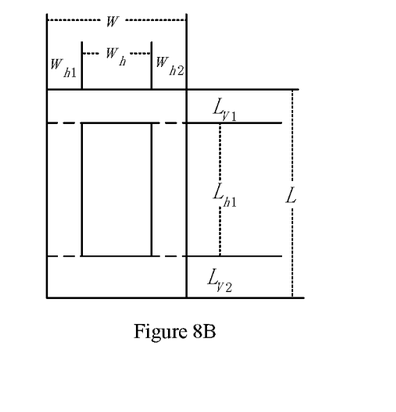
FIG. 8B is a schematic diagram showing the arrangement of a pixel region on the black matrix, according to embodiments of the disclosure.

Additionally, in embodiments, the high-resistance film material layer is formed by a black matrix doped with carbon powder. Due to the presence of openings in the black matrix which has a grid structure, a light transmission region is disposed in each pixel region. Referring to FIGS. 8A and 8B, taking one pixel region on the top left corner of the black matrix as an example, since each pixel region may be equivalent to one rectangular structure with an equivalent length L, an equivalent width w, an equivalent thickness d, and resistivity ρ, if the black matrix is formed as the whole layer free of openings, the equivalent resistance of the black matrix corresponding to the rectangular structure, $$R = \rho \frac{L}{dew} = R_{\Pi e1} * \frac{L}{w},$$

where $R_{\Pi e1}$ denotes the equivalent square resistance thereof.

FIG. 8B is a schematic diagram showing the structure of one pixel region in the black matrix, according to embodiments of the disclosure. A light transmission region is disposed in the pixel region, and is equivalent to a rectangular structure with an equivalent length $L_{h1}$ and an equivalent width $w_h$.

Additionally, the pixel region may be divided into four parts, including: a first part, the length, width, thickness and resistance of which are respectively $L_{V1}$, W, $d_{e2}$ and $R_{v1}$; a second part, the length, width, thickness and resistance of which are respectively $L_{V2}$, w, $d_{e2}$ and $R_{v2}$; a third part, the length, width, thickness and resistance of which are respectively $L_{h1}$, $w_{h1}$, $d_{e2}$ and $R_{h1}$; and a fourth part, the length, width, thickness and resistance of which are respectively $L_{h2}$, $w_{h2}$, $d_{e2}$ and $R_{h2}$, where $L_{h1}$=$L_{h2}$.

Thus, in the pixel region provided with the light transmission region, the actual square resistance of the black matrix is denoted by $R_{\Pi e2}$, and the resistance of the black matrix is obtained as $$R_{mesh} = \frac{R_{h1} * R_{h2}}{R_{h1} + R_{h2}} + R_{v1} + R_{v2},$$

where, the values of $R_{h1}$, $R_{h2}$, $R_{v1}$ and $R_{v2}$ may be calculated according to the above formulae, and it may further obtained by calculation that:

$$R_{mesh} = R_{\Pi e2} * \left( \frac{L_{h2} + L_{h2}}{L_{h2}W_{h2} + L_{h2}W_{h2}} + \frac{l_{v2}}{W_{v2}} + \frac{l_{v2}}{W_{v2}} \right) =$$

$$R_{\Pi e2} * \left( \frac{l_{h2}}{W_{h2} + W_{h2}} + \frac{L - l_{v2}}{W} \right).$$

Given that $$w - w_h = w_{h2} + w_{h1}, \quad R_{mesh} = R_{\Pi e2} * \left( \frac{l_{h2}}{W - W_h} + \frac{L - L_{v2}}{W} \right).$$

If $R=R_{nesh}$, the actual square resistance and the equivalent square resistance of the black matrix meet the formula below:

$$R_{\Pi e1} * \frac{L}{W} = R_{\Pi e2} * \left( \frac{l_{h2}}{W - W_h} + \frac{L - l_{h2}}{W} \right).$$

If the content of carbon powder in the black matrix is constant and the resistivity is the same, the preceding formula may be further simplified as:

$$\frac{l}{d_2} * \left( \frac{l_{h2}}{W - W_h} + \frac{L - l_{h2}}{W} \right) = \frac{l}{d_2} * \frac{L}{W}$$

Therefore, by only adjusting the thickness of the black matrix, it may be obtained that $R=R_{nesh}$.

In the touch display panel, according to embodiments of the disclosure, the opposite substrate includes the first base substrate, on which the high-resistance film material layer with a square resistance larger than or equal to $10^7$Ω/□ and less than or equal to $10^{12}$Ω/□ is disposed. By using such high-resistance film material layer, the generated static electricity such as charges generated due to a high voltage (for example, at or above the level of kilovolt) may be discharged via the high-resistance film material layer for the purpose of releasing the static electricity. However, during touch detection, the high-resistance film material layer will not release charges accumulated due to a touch by a finger and the like, that is, the high-resistance film material layer has a weak shielding effect on the charge signal generated due to the touch by the finger and the like, without influencing the touch sensing performance of the touch display panel. In some embodiments, the high-resistance film material layer may be formed by a black matrix on the opposite substrate, so that the technical solution of the disclosure may be realized without changing the manufacturing process of the opposite substrate.

In embodiments of the disclosure, the touch sensing performance of the touch display panel that employs the high-resistance film material layer is verified by experiments. As shown in Table 1 below, the strength of touch sensing signals generated due to pressing by a metal pole is measured in the absence of a high-resistance film material layer and in the presence of a high-resistance film material layer with a square resistance of $10^8 \Omega/\square$, where, the touch sensing signals include: a touch sensing signal 1 measured at one end of the touch signal line that is near to the control chip, and a touch sensing signal 2 measured at the other end of the touch signal line that is away from the control chip. Additionally, the strength of a noise signal without touching is further measured. The measurement result is shown in Table 1 below:

TABLE 1

|  | Touch Sensing Signal 1 | Touch Sensing Signal 2 | Noise Signal |
| --- | --- | --- | --- |
| Without High-Resistance Film Material Layer | 2125 | 2575 | 19 |
| With High-Resistance Film Material Layer | 2789 | 3198 | 16 |

It may be seen from Table 1 that, the strength of the touch sensing signal in the presence of the high-resistance film material layer is higher than the strength of the touch sensing signal in the absence of a high-resistance film material layer. Further, if a touch does not occur, the strength of the noise signal in the presence of the high-resistance film material layer is slightly different from the strength of the noise signal in the absence of the high-resistance film material layer, thus the high-resistance film material layer will not influence the touch sensing performance of the touch display panel.

In embodiments of the disclosure, the static electricity discharge performance of the touch display panel that employs the high-resistance film material layer is verified by experiments. Table 2 shows the static electricity discharge performance of a touch display panel that employs a high-resistance film material layer with a square resistance of $10^9 \Omega/\square$:

TABLE 2

|  | Static Voltage | | | | | | |
| --- | --- | --- | --- | --- | --- | --- | --- |
|  | 8 kv | −8 kv | 9 kv | 10 kv | −10 kv | −11 kv | −12 kv |
| Display Effect | No color distortion | No color distortion | No color distortion | No color distortion | No color distortion | No color distortion | No color distortion |

Table 3 shows the static electricity discharge performance of a touch display panel that employs a high-resistance film material layer with a square resistance of $10^8 \Omega/\square$:

TABLE 3

|  | Static Voltage | | | | | | |
| --- | --- | --- | --- | --- | --- | --- | --- |
|  | 8 kv | −8 kv | 9 kv | 10 kv | −10 kv | −11 kv | −12 kv |
| Display Effect | No color distortion | No color distortion | No color distortion | No color distortion | No color distortion | No color distortion | No color distortion |

Table 4 shows the static electricity discharge performance of a touch display panel without a high-resistance film material layer:

TABLE 4

|  | Static Voltage | | | | | | |
| --- | --- | --- | --- | --- | --- | --- | --- |
|  | 8 kv | −8 kv | 9 kv | 10 kv | −10 kv | −11 kv | −12 kv |
| Display Effect | No color distortion | No color distortion | No color distortion | Color distortion occurs | Color distortion occurs | Color distortion occurs | Color distortion occurs |

It may be seen from the above Table 2, Table 3 and Table 4 that, when a high-resistance film material layer with a square resistance of $10^8\Omega/\square$ or $10^9\Omega/\square$ is used, the touch display panel does not suffer from color distortion even when the static electricity voltage reaches −12 KV, thus improving the static electricity discharge performance of the touch display panel. However, in the absence of the high-resistance film material layer, the touch display panel will suffer from color distortion when the static electricity voltage reaches 10 kv.

It should be noted that the above described are embodiments of the disclosure and the used technical principles. Those skilled in the art will appreciate that the disclosure is not limited to the specific embodiments described herein. The various obvious alterations, readjustments and alternations may be made out without departing from the protection scope of the disclosure. Therefore, the disclosure has been described in detail by the above embodiments, but the disclosure is not limited to the above embodiments and also includes more other embodiments without departing from the scope of the disclosure as determined by the scope of the appended claims.

Various modifications and additions can be made to the exemplary embodiments discussed without departing from the scope of the disclosure. For example, while the embodiments described above refer to particular features, the scope of this disclosure also includes embodiments having different combinations of features and embodiments that do not include all of the described features. Accordingly, the scope of the disclosure is intended to embrace all such alternatives, modifications, and variations as fall within the scope of the claims, together with all equivalents thereof.

We claim:

1. A touch display panel, comprising an array substrate and an opposite substrate disposed opposite to the array substrate;
   wherein the opposite substrate comprises a first base substrate and a high-resistance film material layer which is disposed on the first base substrate,
   wherein the array substrate comprises a second base substrate, and a common electrode layer and a grounding piece which are disposed on the second base substrate,
   wherein a first conductive line is disposed between the first base substrate and the second base substrate, and the high-resistance film material layer is grounded via the first conductive line,
   wherein the second base substrate comprises a display region and a non-display region around the display region, a drive signal circuit is disposed in the non-display region of the second base substrate, data lines and scan lines are disposed in the display region of the second base substrate, and one or more of the data lines and the scan lines are electrically connected with the drive signal circuit via a bridge structure located in the non-display region,
   wherein a projection of the first conductive line onto the second base substrate is separate from a projection of the drive signal circuit onto the second base substrate.

2. The touch display panel of claim 1, wherein a perimeter sealant is disposed between the opposite substrate and the array substrate, and at least a portion of the perimeter sealant is conductive to form the first conductive line.

3. The touch display panel of claim 2, wherein the perimeter sealant has a frame-shaped structure, and at least one side edge and/or at least one corner region of the perimeter sealant is conductive.

4. The touch display panel of claim 1, wherein a perimeter sealant is disposed between the opposite substrate and the array substrate, and a conductive silver paste is disposed as the first conductive line on the outside of the perimeter sealant.

5. The touch display panel of claim 4, wherein the perimeter sealant is made of a nonconductive material.

6. The touch display panel of claim 5, wherein the perimeter sealant has a frame-shaped structure, and the conductive silver paste is disposed on the outside of at least one side edge and/or at least one corner region of the perimeter sealant.

7. The touch display panel of claim 1, wherein a second conductive line is disposed on the second base substrate, a first end of the second conductive line is electrically connected with the first conductive line, and a second end of the second conductive line is grounded.

8. The touch display panel of claim 7, wherein a first bonding pad is disposed on the first base substrate, and/or a second bonding pad is disposed on the second base substrate; the high-resistance film material layer is electrically connected with the first conductive line via the first bonding pad, and the first conductive line is electrically connected with the second conductive line via the second bonding pad.

9. The touch display panel of claim 1, wherein the array substrate further comprises a common electrode layer disposed on the second base substrate, the common electrode layer comprises a plurality of common electrode blocks operable as touch electrodes.

10. The touch display panel of claim 1, wherein the high-resistance film material layer is a black matrix doped with carbon powder on the opposite substrate, and the square resistance of the high-resistance film material layer is an equivalent square resistance of the black matrix.

11. The touch display panel of claim 10, wherein an optical density of the black matrix is larger than or equal to 3.

12. The touch display panel of claim 11, wherein a content of the carbon powder in the black matrix and a thickness of the black matrix are configured so that the optical density of the black matrix is larger than or equal to 3 and the equivalent square resistance is larger than or equal to $10^7\Omega/\square$ and less than or equal to $10^{12}\Omega/\square$.

13. The touch display panel of claim 12, wherein the thickness of the black matrix is in a range from 0.5 μm to 3.5 μm.

14. The touch display panel of claim 12, wherein the equivalent square resistance of the black matrix meets a formula of $$R_{\Pi e1} * \frac{L}{W} = R_{\Pi e2} * \left( \frac{l_{h1}}{W - W_h} + \frac{L - l_{h1}}{W} \right)$$

wherein $R_{\Pi e1}$ denotes the equivalent square resistance of the black matrix, $R_{\Pi e2}$ denotes an actual square resistance of the black matrix, L denotes an equivalent length of each pixel region in the black matrix, W denotes an equivalent width of each pixel region in the black matrix, $l_{h1}$ denotes an equivalent length of a light transmission region in each pixel region, and $w_h$ denotes an equivalent width of the light transmission region in each pixel region.

15. A touch display panel, comprising an array substrate and an opposite substrate disposed opposite to the array substrate;

wherein the opposite substrate comprises a first base substrate and a high-resistance film material layer which is disposed on the first base substrate, wherein the array substrate comprises a second base substrate, and a common electrode layer and a grounding piece which are disposed on the second base substrate, wherein a first conductive line is disposed between the first base substrate and the second base substrate, and the high-resistance film material layer is grounded via the first conductive line, wherein the second base substrate comprises a display region and a non-display region around the display region, a drive signal circuit is disposed in the non-display region of the second base substrate, data lines and scan lines are disposed in the display region of the second base substrate, and one or more of the data lines and the scan lines are electrically connected with the drive signal circuit via a bridge structure located in the non-display region, wherein an insulating layer is disposed above the bridge structure in a light transmission direction of the touch display panel, and a projection of the first conductive line onto the second base substrate at least partially overlaps a projection of the drive signal circuit onto the second base substrate.

16. A touch display panel, comprising an array substrate and an opposite substrate disposed opposite to the array substrate;

wherein the opposite substrate comprises a first base substrate and a high-resistance film material layer which is disposed on the first base substrate, wherein the array substrate comprises a second base substrate, and a common electrode layer and a grounding piece which are disposed on the second base substrate, the common electrode layer comprises a plurality of common electrode blocks operable as touch electrodes, wherein a first conductive line is disposed between the first base substrate and the second base substrate, and the high-resistance film material layer is grounded via the first conductive line, wherein the second base substrate comprises a display region and a non-display region around the display region, a drive signal circuit is disposed in the non-display region of the second base substrate, data lines and scan lines are disposed in the display region of the second base substrate, and one or more of the data lines and the scan lines are electrically connected with the drive signal circuit via a bridge structure located in the non-display region, wherein a projection of the first conductive line onto the second base substrate is separate from a projection of the drive signal circuit onto the second base substrate.

* * * * *